US008393202B2

(12) United States Patent
Baum et al.

(10) Patent No.: US 8,393,202 B2
(45) Date of Patent: Mar. 12, 2013

(54) MEASURING DEVICE FOR A MOMENT WEIGHING SYSTEM AND MOMENT WEIGHING SYSTEM

(75) Inventors: Christian Baum, Berlin (DE); Ronny Jahnke, Falkensee (DE)

(73) Assignee: Siemens Aktiengesellschaft, München (DE)

( * ) Notice: Subject to any disclaimer, the term of this patent is extended or adjusted under 35 U.S.C. 154(b) by 105 days.

(21) Appl. No.: 13/037,539

(22) Filed: Mar. 1, 2011

(65) Prior Publication Data

US 2011/0214922 A1 Sep. 8, 2011

(30) Foreign Application Priority Data

Mar. 2, 2010 (DE) .......................... 10 2010 009 882

(51) Int. Cl.
*G01M 15/00* (2006.01)

(52) U.S. Cl. .................................... 73/116.04

(58) Field of Classification Search ........................ None
See application file for complete search history.

(56) References Cited

U.S. PATENT DOCUMENTS

| 5,083,463 A | 1/1992 | Ford |
| 5,195,363 A | 3/1993 | Gossler |
| 2009/0178480 A1* | 7/2009 | Clubine .......................... 73/455 |

FOREIGN PATENT DOCUMENTS

JP 2000046675 A 2/2000

* cited by examiner

*Primary Examiner* — Robert R Raevis

(57) ABSTRACT

A measuring device for a moment weighing system is provided. The measuring device includes a base plate with a plurality of fixing openings, a receiving plate, arranged rotatably on the base plate, including a plurality of receiving openings and a plurality of fixing openings, a measurement receptacle, arranged on the receiving plate for a measurement object, with the measurement receptacle engaging in part of the receiving openings, and a plurality of fixing pins which fix the measurement receptacle in a measurement position by way of engagement in part of the fixing openings in the base plate and receiving plate.

11 Claims, 7 Drawing Sheets

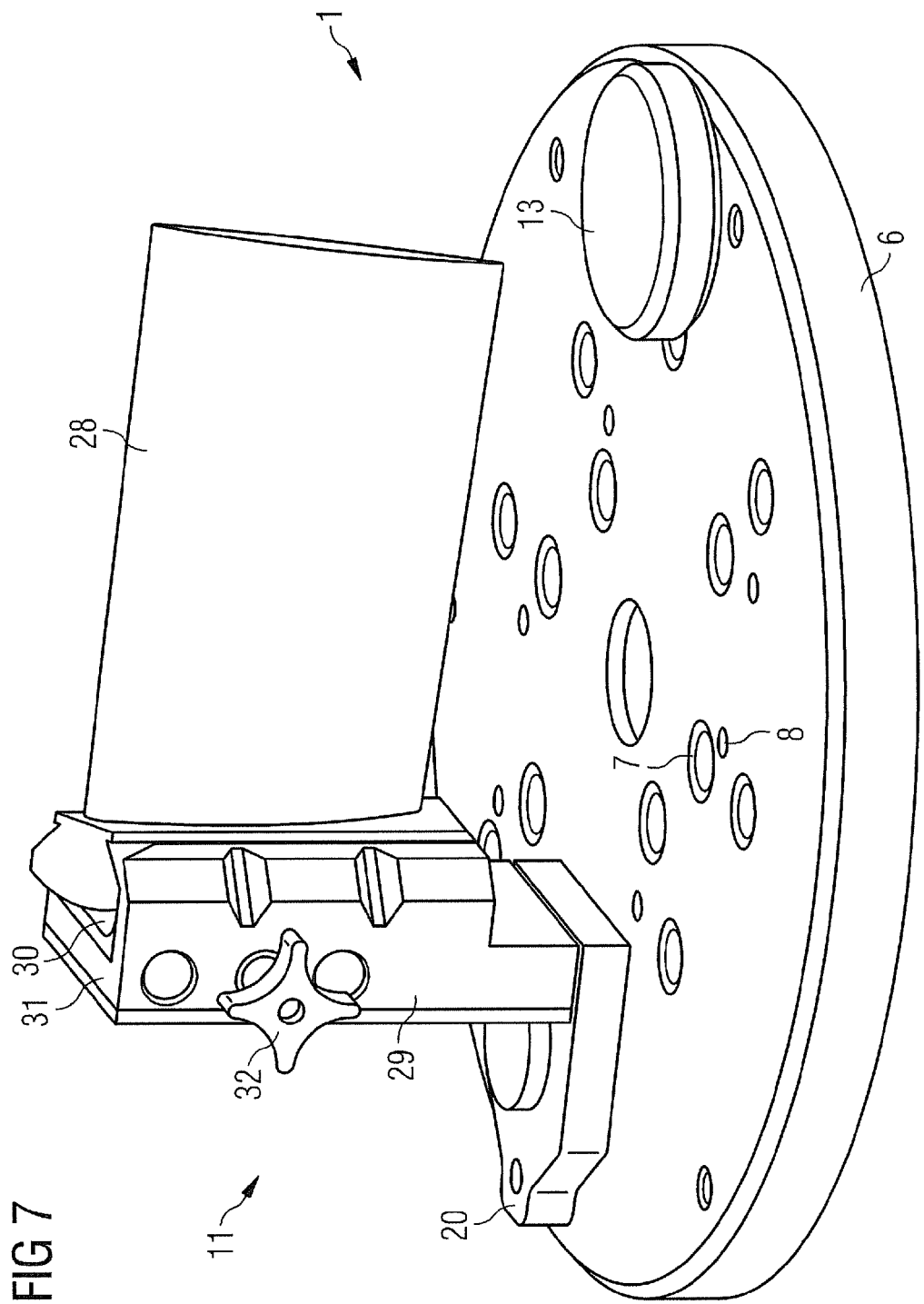

MEASURING DEVICE FOR A MOMENT WEIGHING SYSTEM AND MOMENT WEIGHING SYSTEM

CROSS REFERENCE TO RELATED APPLICATIONS

This application claims priority of German application No. 10 2010 009 882.5 DE filed Mar. 2, 2010, which is incorporated by reference herein in its entirety.

FIELD OF INVENTION

The invention generally relates to a measuring device for a moment weighing system. In addition the invention relates to a movement weighing system, in particular a moment weighing system for turbine blades and compressor blades.

BACKGROUND OF INVENTION

When measuring moments, exact fixing and centering of the measurement objects are important for an exact measurement. In practice, this usually means that there must be a dedicated measuring device for each measurement object.

When determining moment weights for turbine and compressor rotating blades or turbine and compressor blades, the blades to be weighed must be fixed exactly on the moment weighing system by means of a device. The blades must be clamped at the root because this is where the surfaces relevant for installation are located. Different blades need to be fixed at different positions depending on the type and/or the position of the center of gravity. Due to the large number of blade types, many different devices are necessary.

SUMMARY OF INVENTION

It is an object of the invention to improve the moment measurement of measurement objects.

This object is achieved according to the invention by the features of the claims.

According to a first aspect of the invention, a measuring device for a moment weighing system comprises a base plate with a plurality of fixing openings, a receiving plate, arranged rotatably on the base plate, having a plurality of receiving openings and fixing openings, a root measurement receptacle, arranged on the receiving plate, for a measurement object, with the measurement receptacle engaging in part of the receiving openings and a plurality of fixing pins which fix the measurement receptacle in a measurement position by way of engagement in part of the fixing openings in the base plate and receiving plate. The measuring device has a modular design, with the result that only the measurement receptacle and not the entire device needs to be changed for different measurements, which results in lower device costs, lower masses to be moved and less required shelf volume for storing measurement receptacles that are not currently in use.

In the measuring device for a moment weighing system, the receiving openings and the fixing openings can be arranged such that they form a protection against incorrect placement for different measurement receptacles. The pattern formed by the receiving openings and fixing openings ensures, firstly by a suitable selection or coding of the openings and secondly by the design of the measurement receptacles, that the measurement object is always in the exact measurement position during measurement. Incorrect placements by the operator are thus ruled out, since in such a case the measurement receptacle cannot be attached at all or the measuring device cannot be fixed in the measurement position. A sensor which gives out warnings and/or indications to the operator as to how the measurement receptacle is to be attached can supplement this. The receiving openings can serve for attaching the measurement receptacle while the fixing openings serve for coding (protection against incorrect placement). Both types of openings can be incorporated into the protection against incorrect placement, with the result of a large number of possibilities for the positioning of the measurement receptacles in a manner that ensures correct placement.

The base plate can have three contact regions for three load cells of the moment weighing system and the measurement position can be fixed relative to the three contact regions. Three contact regions permit complete coverage of the measurement in an x-y-plane with the minimum number of contact regions or load cells. By fixing the measurement position relative to the contact regions, it is possible to measure reliably and reproducibly.

The three contact regions can be arranged in an isosceles triangle. This permits good positioning of elongate measurement objects such as turbine blades.

The measurement object can be orientated, in the measurement position, along the perpendicular bisector of the base of the isosceles triangle. Such positioning permits good distribution of the mass of the measurement object over the contact regions or load cells.

The fixing pins can be arranged in the fixing holes of the receiving plate such that they can be displaced. This facilitates handling because the fixing pins can remain permanently in the fixing holes of the receiving plate and can be displaced into the fixing holes of the base plate as necessary. The fixing pins can have a part, such as a pin or a ball, which is biased using a spring, is pushed up into the fixing holes of the base plate and is moved back by the spring into the fixing hole of the receiving plate when not in use.

The measurement receptacle can be inserted by way of the engagement of the fixing pins (into the base plate). A part of the measurement receptacle or a (coding) pin, inserted into the measurement receptacle, can engage into the fixing hole of the receiving plate when the measurement receptacle is inserted into the receiving plate or attached thereto. As a result, the fixing pin or a part thereof is moved into the fixing hole of the base plate with the result that base plate and receiving plate are fixed to each other.

The measurement receptacle can comprise a horizontal cylindrical attachment element for engagement into the region between bearing flank and free flank of the blade root profile ("blade attachment groove" below) of a turbine blade to be measured and a bearing block, arranged vertically below the attachment element, for a blade root of the turbine blade to be measured. This self-centering attachment requires no tensioning screw or the like. As a result, damage and/or interfering measurement influences are avoided. In addition, the turbine blade is fixed in a positive-locking manner. Owing to the positive-locking fit, reproducibility is considerably better and operator influence is non-detectable. Heavy turbine blades in particular are moved in a perpendicular position by means of a crane. The measurement receptacle enables placement of the turbine blade in an initially perpendicular position on the bearing block and the screwing-in of the turbine blade into the measurement position with simultaneous self-centering. This facilitates handling of the turbine blade.

A slide bearing can support the turbine blade to be measured in the region of the blade root. The slide bearing, for example in the form of a ball-bearing roller, reduces friction during placement and/or screwing-in of the turbine blades to be measured. This facilitates the measurement and prevents damage and/or stresses which interfere in the measurement.

The slide bearing can be arranged such that it supports the turbine blade to be measured in the region of the blade platform. The spacing between the slide bearing and the cylindrical attachment element is thus optimized in a manner such that stable mounting of the turbine blade is achieved.

The measurement receptacle can have a vertical receiving opening for a compressor blade and slide bearings can be arranged along the receiving opening. With this measurement receptacle it is also possible to measure compressor blades which cannot be fixed by means of a cylindrical attachment element on account of their special root profile. The slide bearings can be used to fix a compressor blade simply and reliably in the receiving opening.

The measuring device can be designed such that the center of mass of an inserted turbine blade is located substantially over the center of gravity of the measuring device. As a result, the mass of the measuring device can be reduced in comparison with measuring devices in the prior art, in which a shift in the overall center of gravity, when the turbine blade has been inserted, is prevented by the mass of the measuring device being similar to or greater than the mass of the turbine blade.

According to a second aspect of the invention, a moment weighing system comprises at least one measuring device as described above. The moment weighing system can comprise a plurality of measuring devices or measurement receptacles. This yields a modular system which permits simple handling of the moment weighing system.

The moment weighing system can comprise three load cells which are arranged in an isosceles triangle. This permits good measurement of elongate measurement objects such as turbine blades, for example, which are arranged in a measurement receptacle.

The measurement object can be orientated, in the measurement position, along the perpendicular bisector of the base of the isosceles triangle. Such positioning permits good distribution of the mass of the measurement object over the load cells. In addition, comparability of the measurements is possible due to this fixed measurement position.

BRIEF DESCRIPTION OF THE DRAWINGS

The invention will be explained in more detail below with reference to the drawings, in which:

FIG. 7 shows a perspective illustration of the measurement receptacle on the receiving plate with inserted compressor blade according to the invention.

The drawings merely serve for explaining the invention without limiting it. The drawings and the individual parts are not necessarily shown to scale. Identical reference signs designate identical or similar parts.

DETAILED DESCRIPTION OF INVENTION

Figure 1:
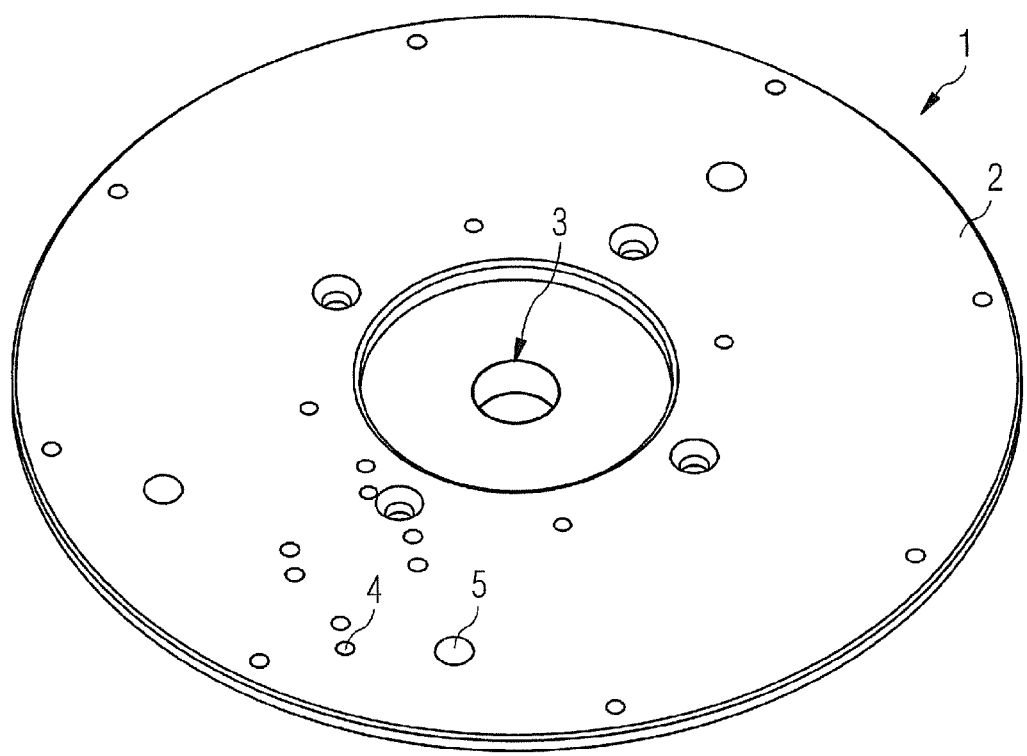
FIG. 1 shows a base plate of the measuring device according to the invention.

FIG. 1 shows a disk-type base plate 2 of the measuring device 1. The base plate 2 has a central opening 3 with a circumferential concentric recess. The central opening 3 and the concentric recess serve for receiving a receiving plate (not shown in this figure). The base plate 2 has a large number of fixing openings 4. The fixing openings 4 can be designed either as through-holes or as blind holes. The fixing openings 4 are arranged substantially in a partial region of the base plate 2. This partial region serves for positioning measurement receptacles (not shown in this figure either) in a measurement position.

On its underside, the base plate 2 has three contact regions 5, which are designed for the placement of three load cells of a moment weighing system. The three contact regions 5 are arranged in an isosceles triangle. The fixing openings 4 can be arranged for example within the isosceles triangle and/or along, or symmetrically with respect to, the perpendicular bisector of the base of the isosceles triangle. The contact regions 5 can be specially designed regions on the base plate 2, such as elevations or indentations. It is also possible, however, for each part of the base plate 2 to be a contact region 5 because each part of the base plate 2 can rest on a load cell. If the moment weighing system already has its own base plate which is attached fixedly onto the load cells, the base plate 2 of the measuring device 1 can also rest on the base plate of the moment weighing system. In that case, no contact regions 5 are necessary, with the base plate 2 of the measuring device 1 then resting with its full area on the base plate of the moment weighing system.

Figure 2:
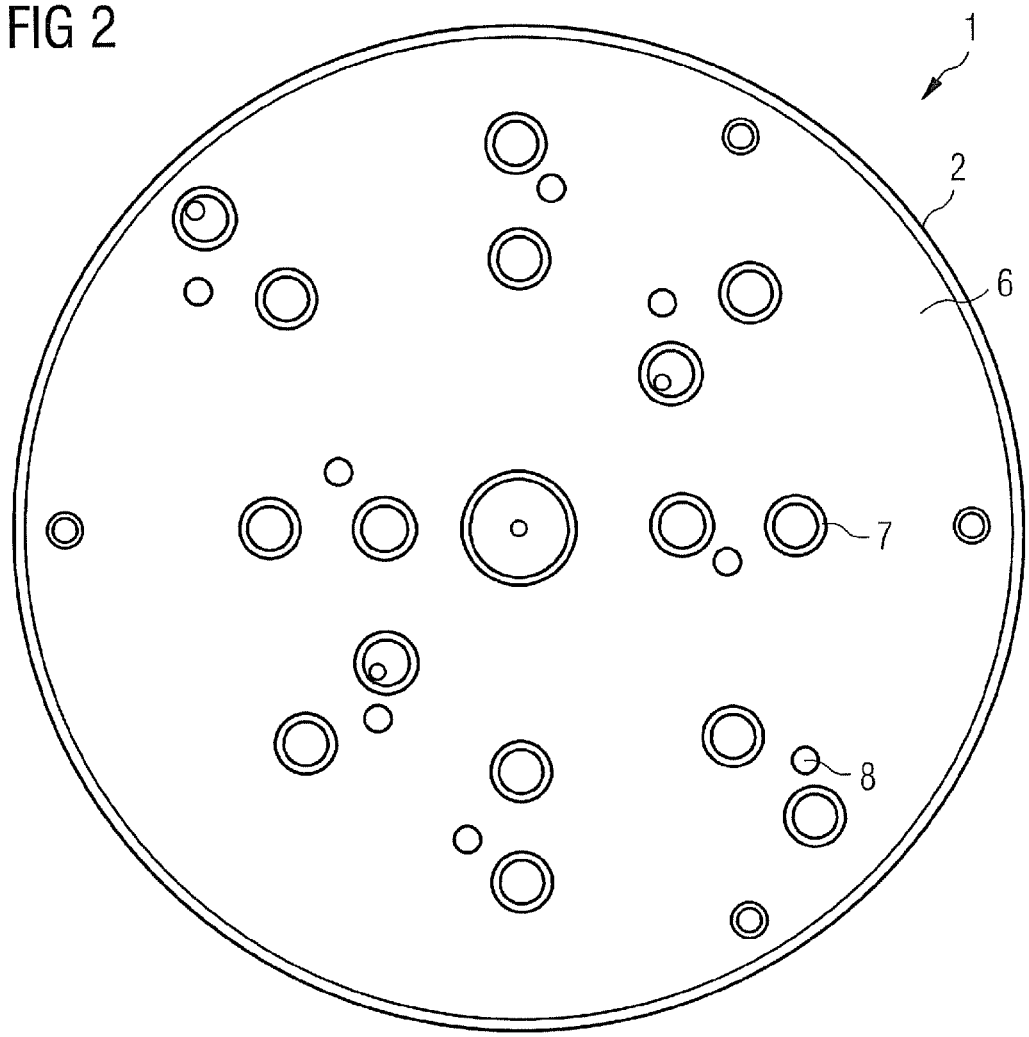
FIG. 2 shows a receiving plate, arranged on the base plate, of the measuring device according to the invention.

FIG. 2 shows the base plate 2 of the measuring device for a moment weighing system 1, and a receiving plate 6 attached rotatably to the base plate 2. The receiving plate 6 has a plurality of receiving openings 7 distributed over the entire surface of the receiving plate 6. The receiving plate 6 furthermore has fixing openings 8 which are likewise distributed over the surface of the receiving plate 6. The arrangement of receiving openings 7 and/or fixing openings 8 is selected such that they form a pattern that ensures correct placement for a measurement receptacle.

By way of example, in each case two receiving openings 7 and one fixing opening 8 can be associated with one measurement receptacle. The alignment of the two receiving openings 7 can be fixed relative each other. However, the positions of the two receiving openings 7 on the surface of the receiving plate 6 can vary, for example in radial spacing from the center of the receiving plate 6 and/or by means of rotation with respect to the radius. The two receiving openings 7 can have different diameters. It is possible in this way to ensure coding or protection against incorrect placement for the measurement receptacles with the aid of the receiving openings 7 alone. In concrete terms this means that a measurement receptacle for a specific measurement object can be attached only in one specific position on the receiving plate 6. Once the measurement receptacle has been attached, the receiving plate 6 can be rotated into the measurement position, with the result that the measurement object is arranged between the contact regions 5 or the loading cells such that reliable and reproducible measurement is ensured.

The fixing openings 8 can likewise be incorporated into the concept of protection against incorrect placement. This increases the number of unique positions for the measurement receptacles.

Figure 3:
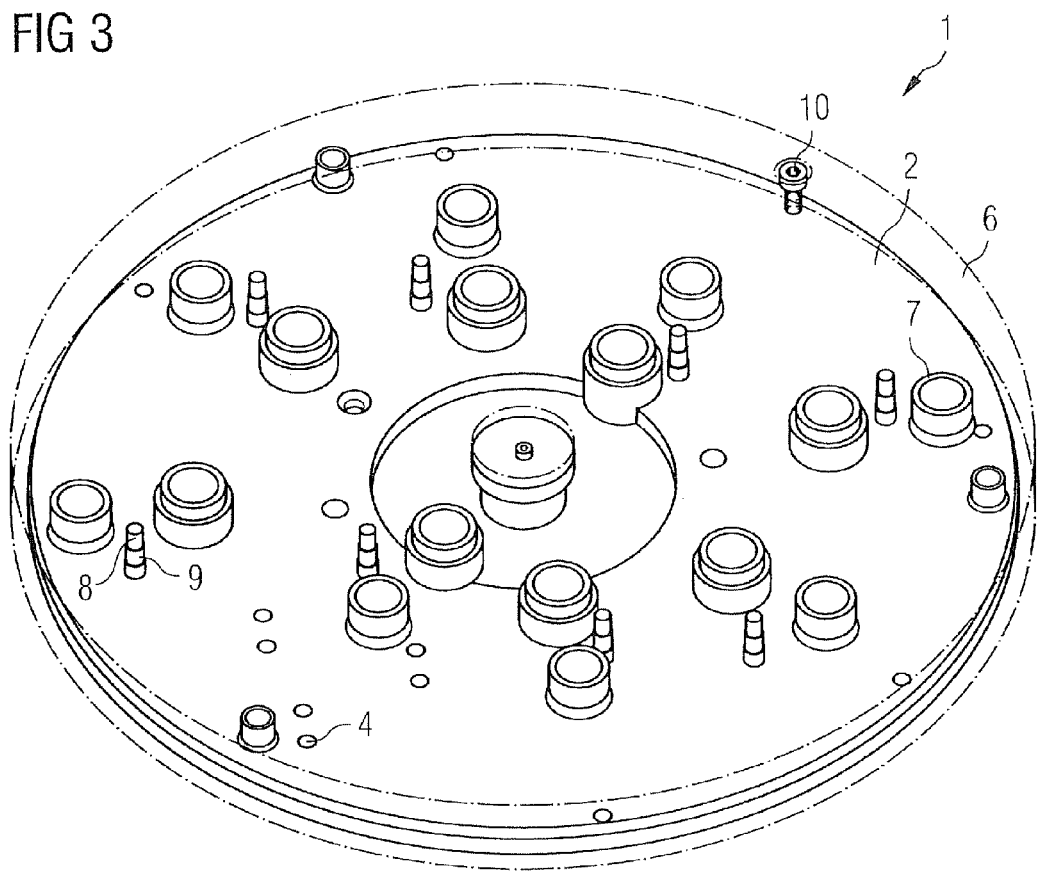
FIG. 3 shows a perspective illustration of the base plate and the receiving plate of the measuring device according to the invention.

FIG. 3 shows a perspective, partially transparent illustration of the base plate 2 with a receiving plate 6 attached thereto, wherein the receiving plate 6 is illustrated as transparent. It can be seen that the fixing openings 4 of the base plate 2 can be aligned with in each case one fixing opening 8 of the receiving plate 6 by rotating the receiving plate 6. Fixing pins 9 are arranged in the fixing openings 8 of the receiving plate 6. The fixing pins 9 are attached in the fixing openings 8 such that they do not protrude beyond the surface of the receiving plate 6. A spring-loaded ball mechanism 10 can be used to achieve locking in the specified measurement positions. A graduation or marking can be located on the receiving plate 6 and/or the base plate 2 preferably on the circumferential surface and can be used to bring the respective measurement receptacle into the measurement position.

Figure 4:
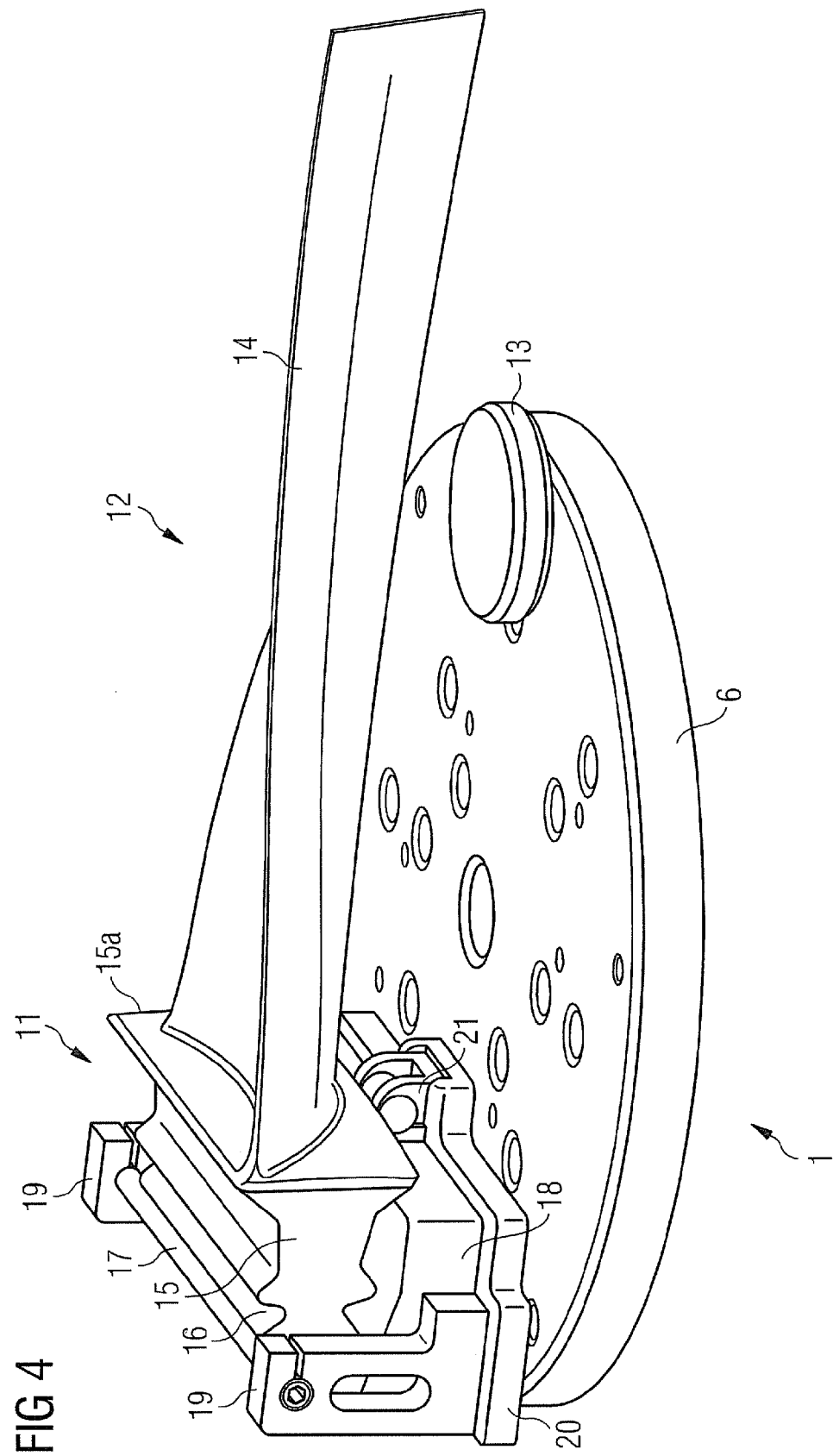
FIG. 4 shows a perspective illustration of the measurement receptacle on the receiving plate with inserted turbine blade according to the invention.

FIG. 4 shows the measuring device 1 with a measurement receptacle 11, into which a turbine blade 12 is placed. A counterbalance 13 is attached on the receiving plate 6 opposite the measurement receptacle 11.

The turbine blade 12 consists of a main blade 14 and a blade root 15. The blade root 15 has what is referred to as a fir tree profile. In each case one groove-type region (blade attachment groove 16) is formed between the bearing flank and the free flank of the fir tree profile.

The measurement receptacle 11 has a horizontal cylindrical attachment element 17, which engages into one of the blade attachment grooves 16. A base plate 20 with a bearing block 18 is arranged vertically below the attachment element 17, with the function of said bearing block 18 being explained further below. The attachment element 17 is attached by means of two holders 19 arranged at the sides of the base plate 20 of the measurement receptacle 11. The base plate 20 is attached to the receiving plate 6 by means of a part of the receiving openings 7.

A slide bearing 21 is arranged on the base plate 20 opposite the attachment element 17. In the mounted state of the measurement receptacle 11, "opposite" means located radially inwards. The slide bearing 21 is realized in this case in the form of a ball-bearing roller. The spacing in the radial direction between the attachment element 17 and the slide bearing 21 is dimensioned such that the turbine blade 14, when it is inserted, rests on the slide bearing 21 with its blade platform 15a.

Figure 5:
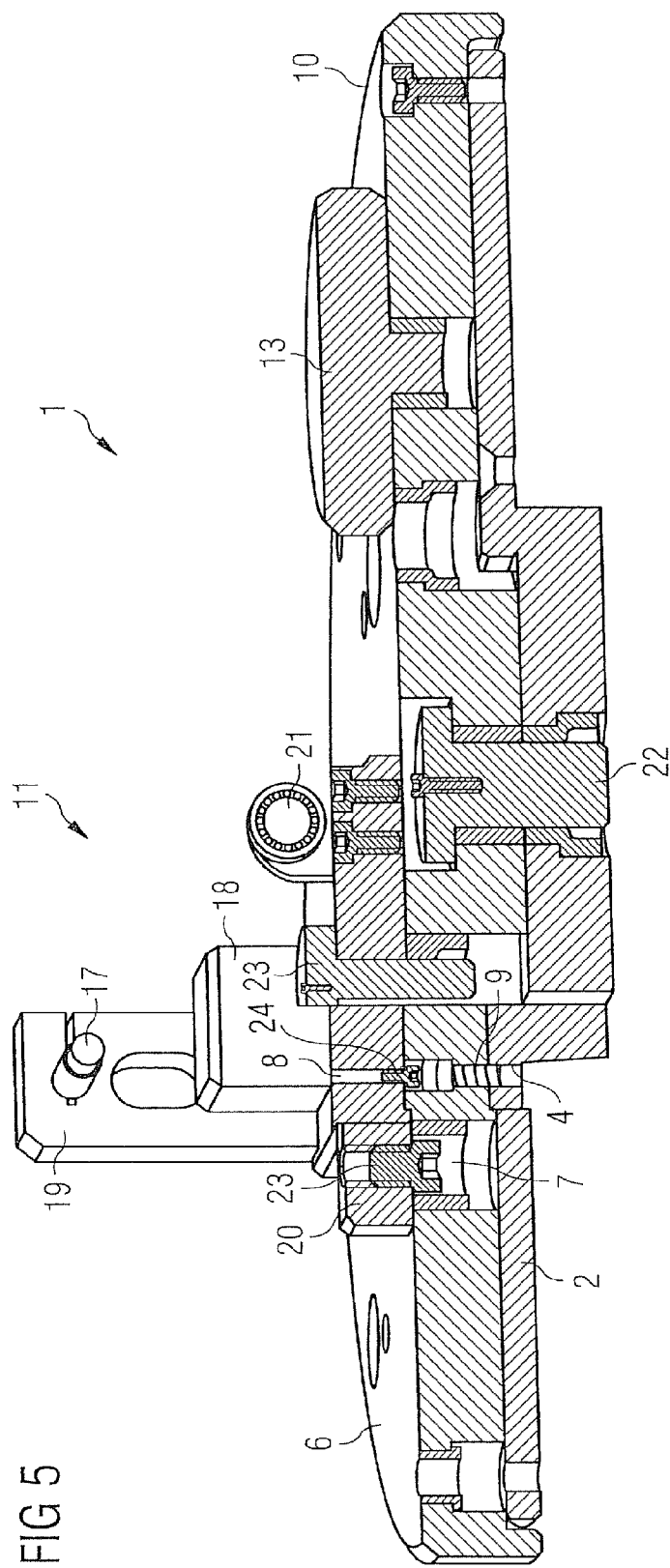
FIG. 5 shows a sectional illustration of the measuring device according to the invention.

FIG. 5 shows a sectional illustration of the measuring device 1 shown in FIG. 4, where the turbine blade is not depicted for a better overview. The receiving plate 6 is rotatably attached centrally on the base plate 2 using a bolt 22. The measurement receptacle 11 is attached by two receiving pins 23 which engage into two receiving openings 7 in the receiving plate 6. The receiving pin 23 can be inserted from below into the base plate 20 of the measurement receptacle 11 or it can be pushed through a hole in the base plate 20 from above through the base plate 20 into the receiving plate 6. The receiving pin 23 can also be designed integrally with the base plate 20. One or both receiving pins 23 can have a screw coupling, a bayonet coupling, a ball lock system or the like for securing the measurement receptacle 11 on the receiving plate 6. The counterbalance 13 is arranged in a receiving opening 7 which is radially opposite the measurement receptacle 11 in the present exemplary embodiment. Alternative positions of a counterbalance or of a plurality of counterbalances are also possible, however, as long as at least the counterbalance or counterbalances can counterbalance the weight of the measurement receptacle.

Overall, the measuring device is designed such that the center of mass of an inserted blade is located substantially over the center of gravity of the measuring device. "Substantially over the center of gravity of the measuring device" should be understood here to mean that minor deviations of the location of the center of mass of an inserted blade from the position over the center of gravity of the measuring device leave the location of the overall center of gravity of the combination of measuring device and blade with respect to the dimensions of the measuring device largely unaffected.

Small deviations of the location of the center of mass from the center of gravity of the measuring device have no interfering effect as long as the center of mass is located over a circular region that surrounds the center of gravity of the measuring device and the radius thereof does not exceed approximately 30% of the radius of the base plate 2, preferably approximately 15% of the radius of the base plate 2. As a result, the mass of the measuring device can be kept smaller as compared to measuring devices according to the prior art because a shift in the overall center of gravity when a turbine blade is inserted is avoided due to the location of the centers of gravity relative to one another rather than due to the mass ratio of measuring device to turbine blade, which improves handling of the measuring device. The correct location of the center of gravity of different turbine blades substantially over the center of gravity of the measuring device is ensured by the receiving openings 7 and fixing openings 4, 8 being arranged such that they form a protection against incorrect placement for different measurement receptacles 11 associated with in each case a different type of turbine blade.

The fixing pin 9 is attached in the fixing opening 8 in the receiving plate 6. A coding pin 24 is attached on the underside of the base plate 20 such that it engages, in the mounted state of the measurement receptacle 11, into the fixing opening 8 in the receiving plate 6. As a result, the fixing pin 9 or a part of the fixing pin 9 is pushed into the fixing opening 4 of the base plate 2.

Figure 6:
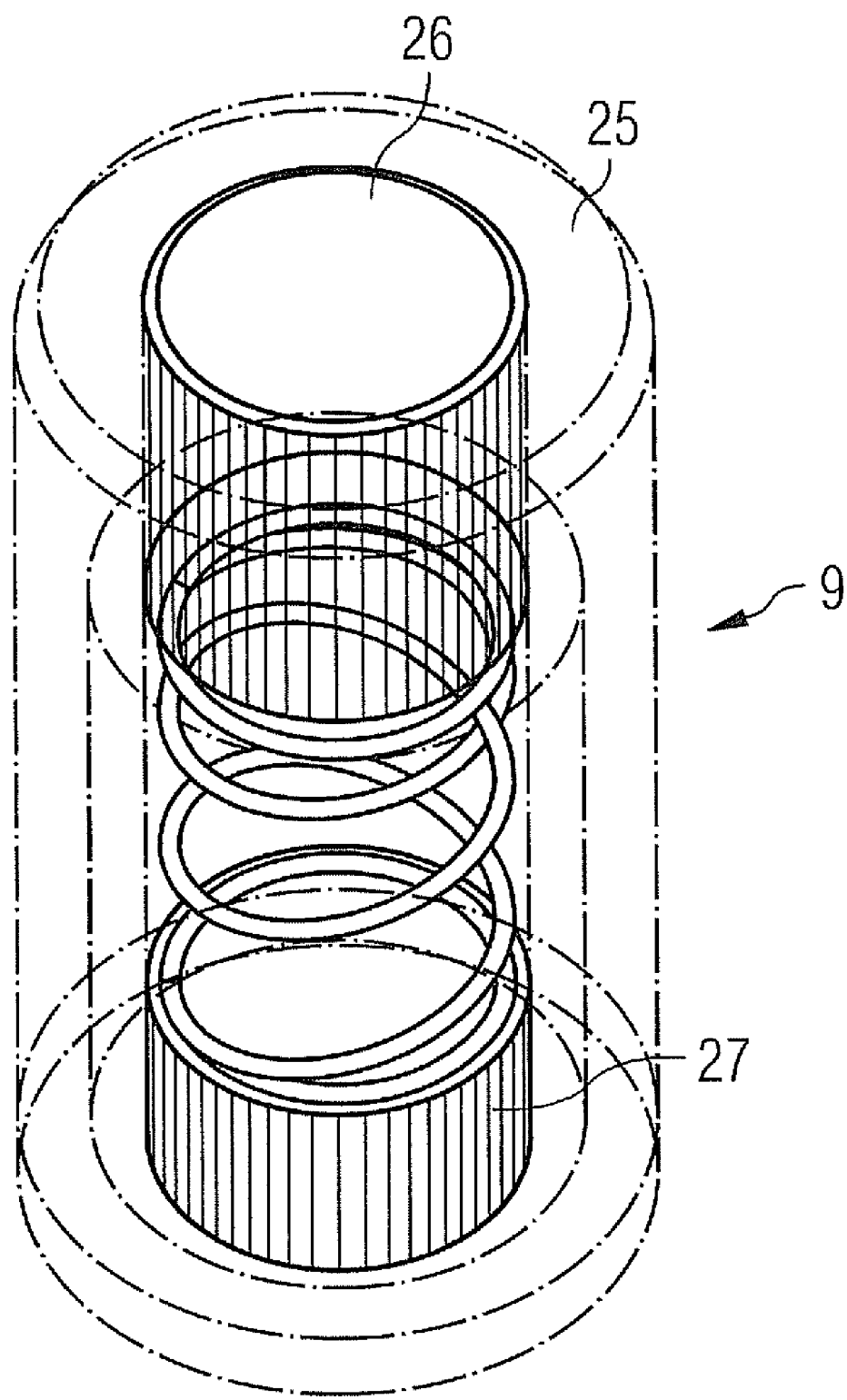
FIG. 6 shows a perspective illustration of a fixing pin according to the invention.

FIG. 6 shows the fixing pin 9 in detail. The fixing pin 9 has an external cylinder 25, which is pushed, for example, into the fixing openings 8 in the receiving plate 6. For this purpose, the external cylinder 25 can have a conical lateral surface. An internal cylinder 26, which forms the actual pin, is arranged in the external cylinder 25 such that it can move in the axial direction. The internal cylinder (pin) 26 is biased with a spring 27, with the result that the front sides of the external cylinder 25 and of the internal cylinder 26 are at least approximately level. The internal cylinder 26 is pushed out of the external cylinder 25 by the coding pin 24 by the length of the coding pin 24. If the coding pin 24 is removed, the spring 27 pushes or pulls the internal cylinder 26 back into the external cylinder 25.

The handling of the measuring device 1 will be described below with reference to FIG. 5. First, the appropriate measurement receptacle 11 for the measurement object is selected. This can be facilitated by way of writing on the measurement receptacle 11 or the use of a list optionally with coding of the measurement receptacle 11. Next, the receiving plate 6 is turned into the measurement position, that is to say such that the receiving opening 7 and the fixing opening 8 for this specific measurement receptacle 11 are in the measurement position. This measurement receptacle 11 can be facilitated by way of a graduation or marking on the receiving plate 6 and/or the base plate 2 and the spring-loaded ball mechanism 10, which forces a locking in fixed positions. The base plate 2 and thus also the receiving plate 6 are already attached on the moment weighing system. Now, the measurement receptacle 11 is attached to the receiving plate 6. In this case, the receiving pins 23 of the measurement receptacle 11 engage into the receiving opening 7 or the receiving plate 6. The coding pin 24 engages in the same way into the fixing opening 8 of the receiving plate 6. The measurement receptacle 11 can only be attached to the receiving plate 6 once all three mentioned plug-in connections engage with one another exactly. The result is a protection against incorrect placement, which minimizes the influence of the operator.

The coding pin 24 of the measurement receptacle 11 pushes a part of the fixing pin 9 into the fixing opening 4 of the base plate 2. As a result, the receiving plate 6 is fixed with the base plate 2 such that the receiving plate 6 and the base plate 2 can no longer rotate relative to each other. The receiving plate 6 is then completely fixed using the tensioning element 22. The counterbalance 13 associated with the measurement receptacle 11 is then placed into an appropriate receiving opening 7 of the base plate 2.

The turbine blade 12 is now inserted into the measurement receptacle 11 (see also FIG. 4). The turbine blade 12 can be placed into the measurement receptacle 11 by way of being placed onto the bearing block 18 by the blade root and tilted into the direction of the receiving plate 6 by the main blade. Here, the turbine blade 12 can be placed onto the bearing block 18 in a virtually horizontal orientation, which is in particular possible if the blades are light-weight. The turbine blade 12 can, however, also be placed onto the bearing block 18 of the measurement receptacle 11 in a perpendicular orientation, which is advantageous especially if the turbine blades are heavy, because they are frequently moved with the aid of a crane, where they are usually suspended off the crane in a perpendicular orientation (blade root downwards). However, it is also possible to place it onto the bearing block 18 in an orientation in the range between the orientations mentioned. Once the turbine blade 12 has been placed onto the bearing block, it is tilted into the horizontal position and in the process guided into its end position. In the end position, the blade attachment groove 16 and the attachment element 17 come to bear against one another, with the blade platform 15a being supported by the slide bearing 21. After the turbine blade 12 has been tilted into the horizontal position, it is no longer in contact with the bearing block 18. Now, moments and/or mass distributions of the turbine blade 12 are measured using the moment weighing system.

FIG. 7 shows the measuring device 1 with a measurement receptacle 11 for a compressor blade 28. The base plate 2 and the receiving plate 6 are identical to the measuring device 1 for the turbine blade 12. This is in accordance with the modular concept of the invention. The receiving plate 6 and the base plate 2 are appropriately coded in order to receive a large number of measurement receptacles 11 in a manner that ensures correct placement. For example, if the number of measurement receptacles is greater than the combinations of receiving openings 7 and fixing openings 8 available on the surface of the receiving plate 6, a plurality of receiving plates 6 can also be used.

The measurement receptacle 11 comprises a base plate 20 on which a holder 29 is attached substantially vertically. A receiving opening 30 is formed in the holder, into which receiving opening a root of the compressor blade 28 is inserted. A plurality of slide bearings 31, which facilitate placement of the compressor blade 28 into the measurement receptacle 11, are arranged in the receiving opening 30. An excenter 32 is then used to brace the root of the compressor blade 28 into the receiving opening 30, with the result that the compressor blade 28 is attached.

The handling of the measurement receptacle shown in FIG. 7 is identical to the handling of the measurement receptacle shown in FIG. 5.

The invention claimed is:

1. A measuring device for a moment weighing system, comprising:
    a base plate including a plurality of fixing openings;
    a receiving plate arranged rotatably on the base plate;
    a counterbalance;
    a measurement receptacle arranged on the receiving plate, for a measurement object; and
    a plurality of fixing pins,
    wherein the receiving plate includes a plurality of receiving openings and a plurality of fixing openings,
    wherein the measurement receptacle engages in part of the plurality of receiving openings,
    wherein the plurality of fixing pins fix the measurement receptacle in a measurement position by way of engagement in part of the plurality of fixing openings in the base plate and receiving plate,
    wherein the base plate includes three contact regions for three load cells of the moment weighing system,
    wherein the measurement position is fixed relative to the three contact regions, and
    wherein the counterbalance is arranged in a receiving opening.

2. The measuring device as claimed in claim 1, wherein the plurality of receiving openings and the plurality of fixing openings are arranged such that they form a protection against incorrect placement for different measurement receptacles.

3. The measuring device as claimed in claim 1, wherein the three contact regions are arranged in an isosceles triangle.

4. The measuring device as claimed in claim 1, wherein the measurement object, in the measurement position, is orientated along a perpendicular bisector of a base of the isosceles triangle.

5. The measuring device as claimed in claim 1, wherein the plurality of fixing pins are arranged in the plurality of fixing holes of the receiving plate such that they may be displaced.

6. The measuring device as claimed in claim 1, wherein the measurement receptacle is inserted by way of the engagement of the plurality of fixing pins.

7. The measuring device as claimed in claim 1,
    wherein the measurement receptacle includes a horizontal cylindrical attachment element for engagement into a blade attachment groove of a turbine blade to be measured, and
    wherein the measurement receptacle includes a bearing block, arranged vertically below the attachment element, for a blade root of the turbine blade to be measured.

8. The measuring device as claimed in claim 7, wherein a slide bearing supports the turbine blade to be measured in a first region of the blade root.

9. The measuring device as claimed in claim 8, wherein the slide bearing is arranged such that it supports the turbine blade to be measured in a second region of the blade platform.

10. The measuring device as claimed in claim 1,
    wherein the measurement receptacle includes a vertical receiving opening for a compressor blade, and
    wherein a slide bearing is arranged along the receiving opening.

11. The measuring device as claimed in claim 1, wherein a center of mass of an inserted turbine blade is located substantially over a center of gravity of the measuring device.

* * * * *